July 28, 1925.
P. MUELLER
FLOAT VALVE
Filed Dec. 31, 1921
1,547,255
2 Sheets-Sheet 2
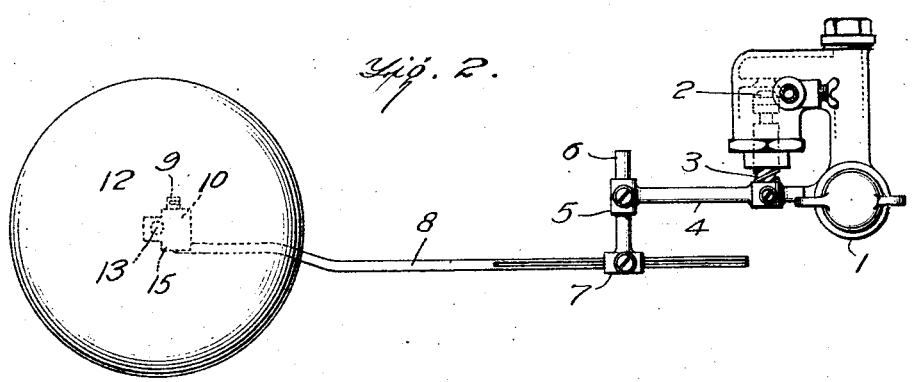
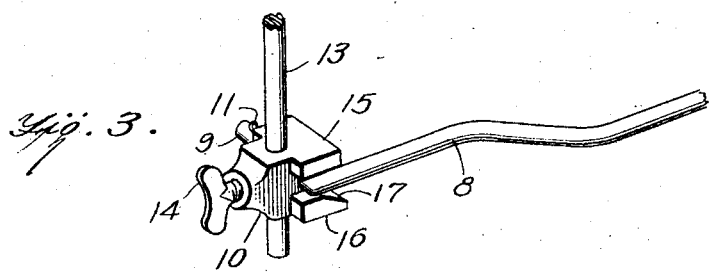
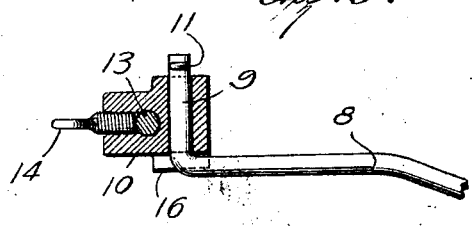
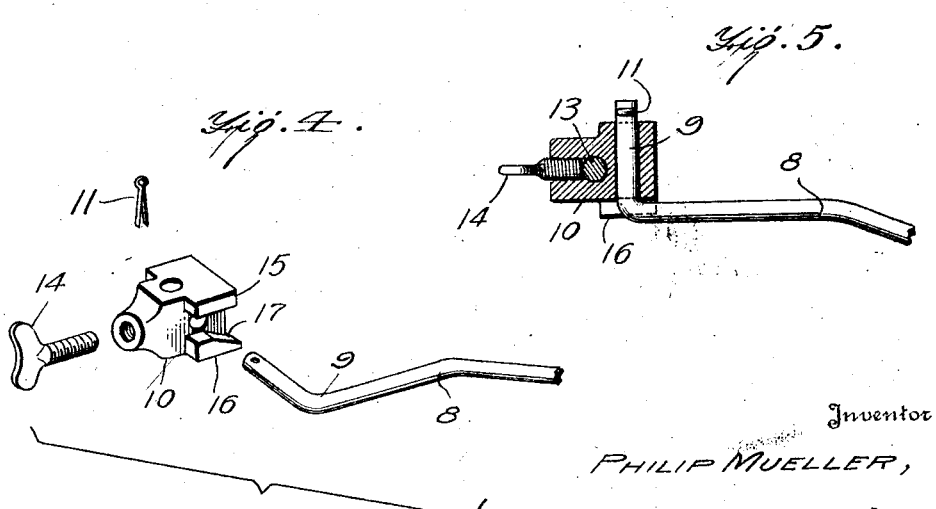
Inventor
PHILIP MUELLER,
By Cushman, Bryant & Darby
Attorneys Patented July 28, 1925.

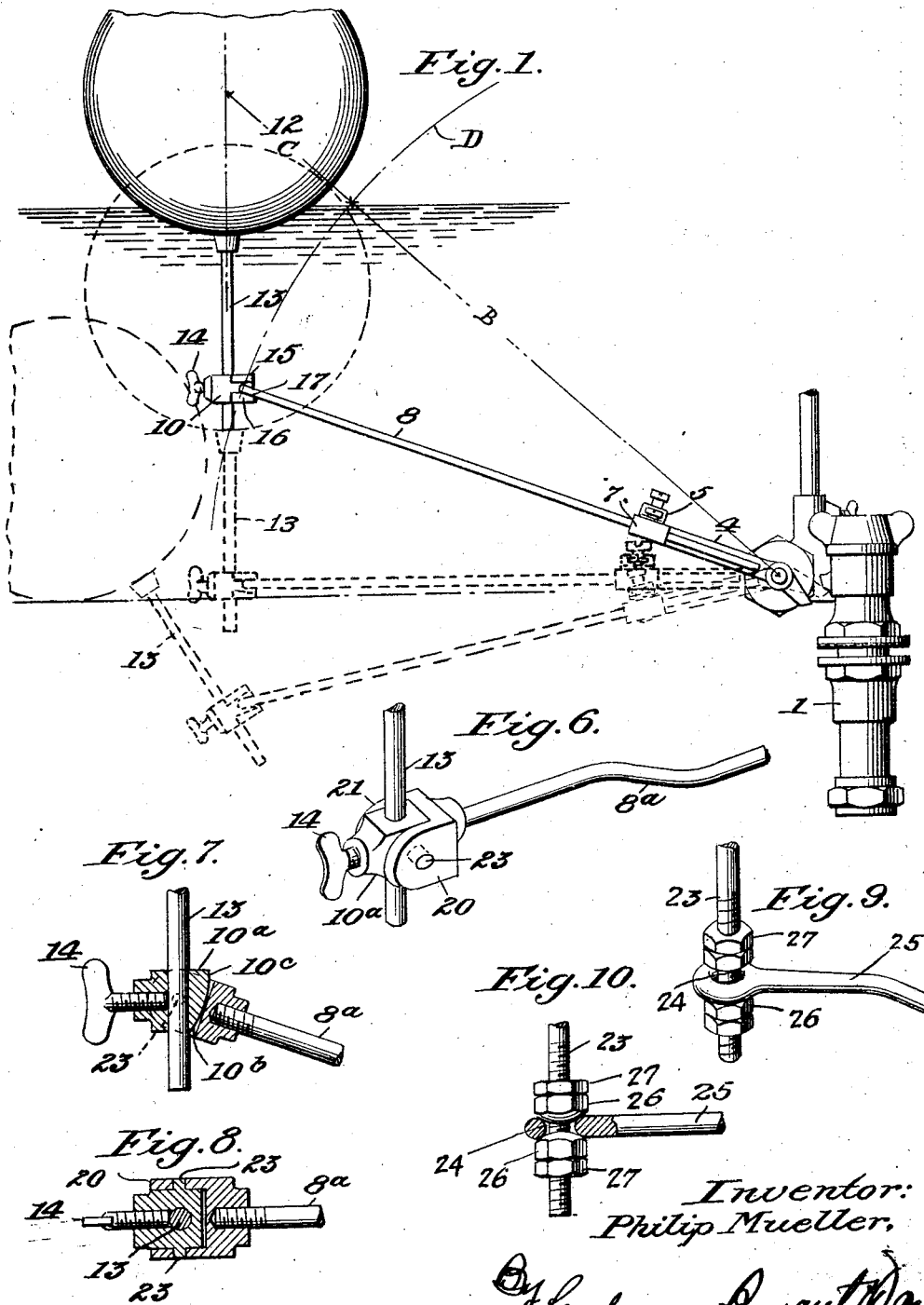

1,547,255

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FLOAT VALVE.

Application filed December 31, 1921. Serial No. 526,134.

*To all whom it may concern:*

Be it known that I, PHILIP MUELLER, a citizen of the United States, residing at Decatur, in the county of Macon and State of Illinois, have invented new and useful Improvements in Float Valves, of which the following is a specification.

The present invention relates to improvements in valves particularly intended for use with flush tanks and in which the valve is actuated by movement of a float supported on a lever arm connected with the valve stem.

The object of the invention is to provide a mounting for the float, or means for connecting it with the valve actuating lever, which will result in a maximum leverage being exerted by said lever during the initial opening of the valve, and also just at the closing of the valve. The invention contemplates, further, means by which the relation of the float to its supporting lever arm may be readily varied so as to have its greatest leverage at the initial opening of the valve and at the final closing thereof.

In the accompanying drawings:

Fig. 1 is a side elevation of an embodiment of the invention, showing in full lines the position of the parts when the valve is closed, and in dotted lines the positions of the parts when the valve is open.

Fig. 2 is a plan of the parts shown in Fig. 1.

Fig. 3 is a detail perspective view of the connection between the float and the lever arm.

Fig. 4 is a view illustrating the several parts of the float valve mounting and end of the lever arm separated.

Fig. 5 is a sectional view through the float valve mounting shown in Figs. 1 to 4.

Fig. 6 is a perspective view illustrating a slightly different form of connection between the lever arm and the float.

Figs. 7 and 8 are respectively vertical and horizontal sectional views of the embodiment of the invention shown in Fig. 6.

Fig. 9 is a detail view of another modification.

Fig. 10 is a sectional view of the construction shown in Fig. 9.

Referring to the drawings, 1 designates the stub inlet through which liquid is supplied to a flushing tank, and the outlet from which it is controlled by a valve 2.

It will be evident that the present invention is adapted for use with fluid inlet and valve mechanisms of various types, and, therefore, in the present drawings, these parts are shown more or less conventionally, and it is to be understood that the invention hereinafter described and particularly pointed out in the claims is not limited to use with the particular fluid supply means shown, or with any other special form of such devices.

In the embodiment of the invention illustrated, the valve stem is provided with a suitable quick acting threaded section 3 that extends beyond the valve casing, and to the outer end thereof is secured an arm 4, at one end of which is provided a sleeve 5 within which is secured a laterally extending arm 6 terminating in a sleeve 7 through which the main float carrying lever arm or rod 8 extends. In the embodiment of the invention illustrated in Figs. 1 to 5, the end of the rod or lever arm 8, remote from the valve, is deflected laterally, and this bent section 9 extends through a passage in a coupling block or connection member 10. A cotter pin 11 or similar means is provided to retain the block 10 in position on the bent end of the lever arm 8, but said block is free to have a limited rocking movement about said lever arm section 9 as an axis. The float 12 is provided with a stem 13 that extends through a suitable passage formed in the block 10 and is held in any desired adjusted relation to said block by means of a set screw 14.

At the end of the block 10 adjacent the rod 8 there are provided two laterally projecting spaced lugs 15 and 16, between which the deflected portion 9 of the lever arm extends, and the lower lug 16 is provided with a beveled or inclined surface 17 adjacent one end so that said block and the float supported thereby may rock about the section 9 of the lever arm in a direction to carry the float from the valve when the lever moves in one direction and thus increase the effective length of the lever arm.

It will be seen that when the liquid in the tank reaches the predetermined level the valve 2 will be closed and the float and its supporting lever will occupy substantially the position shown in full lines in Fig. 1, in which position the stem 13 of the float is substantially perpendicular to the bottom of the tank. As soon as the outlet from the tank is opened and the liquid level in the tank reduced, the float will descend and automatically rock about the axis 9 of its connection with the lever 8, so that its stem will form a substantially right angle with the lever arm when the latter reaches the intermediate horizontal position indicated in dotted lines in Figure 1.

As the tank continues to empty, the float stem 13 will gradually fall outward, due to the tapered surface 17 on the lug 16, until it assumes the lowermost dotted line position shown in Figure 1. When the tank begins to fill, the float 12 will first rock on its pivot at the end of the lever arm 8, and move upward, taking the arm with it, until it reaches the intermediate vertical position shown in dotted lines in Figure 1, where it engages the lug 15 in the manner as shown in Figure 3, so as to prevent the float stem from tilting inwardly to less than a right angle relative to the lever 8. As the float continues to rise, the valve will gradually close until the parts are in the position as indicated in full lines in Figure 1. By reason of the particular means employed for connecting the lever arm 8 with the float stem 13, it will be observed that the lever arm will have its greatest leverage at the initial opening and final closing of the valve. When the float assumes the full line position, as shown in Figure 1, the effective leverage of the float and its operating rod on the valve are as indicated by the dot and dash lines B and C; the line C indicating the increasing leverage over the ordinary float attached directly to the valve operating rod, the path of movement of which is indicated by the dot and dash curved line D.

By reason of this construction, a full open position of the valve is maintained for a considerably longer period than is the case when the float is coupled directly to the valve operating rod, which considerably accelerates the filling of the tank. Furthermore, when the parts assume the full line closed position as shown in Figure 1 with the beveled lug 16 bearing against the under side of the rod 8, the additional leverage indicated by the line C brings about a quick and close seating of the valve, thus avoiding the objections incident to a slow closing valve, due to currents of high velocity flowing through a restricted seat opening.

The lug 15 on the block 10 by which the float is supported will positively prevent said float from turning in one direction about the bent section 9 of the supporting lever 8 and tilting toward the valve beyond a predetermined extent, and the extent of movement of the float about said axis in a direction away from said valve will be limited by the inclined surface 17 of the other lug 16 on said block 10. By means of the set screw 14 the float stem 13 can be adjusted as desired through the passage provided therefor in the block 10 and secured in any suitable relation to the lever arm 8.

In the embodiment of the invention illustrated in Figs. 6, 7 and 8, the lever arm or valve actuating rod $8^a$ is provided at its outer end with spaced ears 20, 21, between which the float supporting block $10^a$ is arranged. In this embodiment of the invention said block is provided with laterally projecting trunnions 23, which fit within suitable apertures formed in the ears 20, 21 and permit the float and its stem to rock about them as an axis in substantially the same manner as hereinbefore described. The rear face of the block $10^a$ is beveled or cut away as at $10^b$ so as to permit of the rocking movement of the float relative to its supporting lever to a limited extent in one direction, the upper rear edge $10^c$ of said block constituting a shoulder which contacts with the member connecting the ears 20, 21 to limit rocking movement of the float relative to the rod $8^a$ in the opposite direction.

In the form of the invention shown in Figs. 9 and 10, a very simple construction is provided to secure this tilting action of the float and the increased leverage. The float stem 23 is screw threaded as shown, and passes through an eye 24 at the end of the lever arm 25 which couples with the valve actuating parts. The eye 24 at the end of the lever arm is beveled as shown in Fig. 10, and the float stem 23 has the beveled nuts 26 on either side of the eye 24 spaced sufficient to permit rocking of the float, suitable lock nuts 27 being provided to maintain the beveled nuts 26 in adjusted position. With this construction, it will be seen that the float stem 23 is capable of tilting in the eye 24 and rocking upon the beveled nuts so as to secure the same increased leverage as with the other forms of the invention.

It is believed that the operation and the advantages of the invention will be readily understood and appreciated from the foregoing description in connection with the drawings. It will be seen that the float will automatically move to a position to first decrease and then increase the effective length and leverage of its supporting arm as soon as there is any substantial decrease of the water level in the tank, so that the opening of the valve will be quickly initiated, and that the increased leverage will be effected during the final closing movements of the valve so that the valve will be quickly and surely brought to its seat.

It will, of course, be understood that while the embodiments of the invention described and illustrated are the preferable forms, so far as experience has shown at this time, they do not constitute the only forms in which the invention may be embodied, and unless specifically described in the following claims, it is not intended to limit the invention to such particular embodiments. There can manifestly be numerous changes in the form and arrangement of the several parts without departing from the scope of the invention.

What I claim is:

1. The combination of a tank supply valve, a lever arm connected to said valve, a float, a coupling connecting said float to said lever arm, and means on said coupling for limiting the outward movement of said float.

2. The combination with a tank supply valve, a lever arm connected to said valve, a float, an adjustable coupling movably connecting said float to said lever, and means on said coupling for engaging said lever for limiting the outward movement of the float.

3. A float actuating valve of the class described comprising a lever arm adapted to be connected to a valve, a float having a stem, an independent coupling adjustably connecting the stem and lever arm and adapted to permit the same to turn freely about a horizontal axis, and means on said coupling for limiting the outward movement of the stem relative to the lever arm.

4. A float actuated valve operating mechanism comprising a lever arm adapted to be connected with a valve, a float having a stem, a coupling connecting the stem, and lever arm, and means on said coupling for limiting movement of the stem and float relative to said lever arm.

5. A float actuated valve operating mechanism comprising a lever arm adapted to be connected with a valve, a float having a stem, a coupling connecting the stem and lever arm so as to permit the stem to turn freely about a horizontal axis, and means on said coupling for limiting movement of the stem and float relative to said lever arm to not less than a right angle.

6. A float actuated valve operating mechanism comprising a lever arm adapted to be connected with a valve, a float having a stem, a coupling connecting the stem and lever arm so as to permit the stem to turn freely about a horizontal axis, and means on said coupling for limiting the movement of the stem to a substantially vertical position relative to the lever arm.

7. A float actuated valve operating mechanism comprising a lever arm adapted to be connected with a valve, a float having a stem, and an independent coupling provided with means for attachment to the float stem and connected with the lever arm to rock about an axis extending transversely of the length of said arm.

8. A float actuated means for operating a valve comprising a lever arm adapted to be connected with a valve, a float, an independent coupling member connected with the lever arm to rock about an axis extending transversely of the length thereof, and means for adjustably connecting the float to said coupling member.

9. A float actuated means for operating a valve comprising a lever arm adapted to be connected adjacent one end with a valve, a block connected with the other end of the lever arm to rock about an axis extending transversely of the length of the arm, stop means for limiting the movement of the block in opposite directions about a horizontal axis, and a float attached to the block.

10. A float actuated means for operating a valve comprising a lever arm adapted to be connected adjacent one end with a valve, a block connected with the other end of the lever arm to rock about an axis extending transversely of the length of the arm, and having a passage therethrough at an angle to said axis, and a float provided with a stem that is adjustably secured in said passage in the block.

11. A float actuated valve operating mechanism comprising a float provided with a stem, a coupling block to which the float stem is secured, and a lever arm adapted to be connected with a valve operating arm and having one end bent laterally and secured in a bearing in said block whereby it constitutes an axis about which the float may rock relative to the lever.

12. A float actuated means for operating a valve comprising a lever arm adapted to be connected adjacent one end with a valve, a block provided with two passages extending therethrough in intersecting planes, means for securing the free end of the lever arm in one of said passages, and a float having a stem extending into and secured in the other passage in said block.

13. A float actuated means for operating a valve comprising a lever arm adapted to be connected, adjacent one end, with a valve the other end of said arm being deflected laterally, a member adapted to be secured on said deflected end of the lever arm to turn thereon as an axis, a float having a stem extending through and adjustably connected with said member, and means for limiting movement of the float supporting member in opposite directions about said axis.

14. A float actuated means for operating a valve comprising a lever arm adapted to be connected, adjacent one end, with a valve the other end of said arm being deflected laterally, a member adapted to be secured on said deflected end of the lever arm to turn thereon as an axis, a float carried by said member, and means on said member co-operating with the lever arm to limit the outward and inward movement of the float about a horizontal axis.

In testimony whereof I have hereunto set my hand.

PHILIP MUELLER.